Nov. 29, 1949      A. ISELI      2,489,644
RADIAL DRILLING MACHINE
Filed April 26, 1947
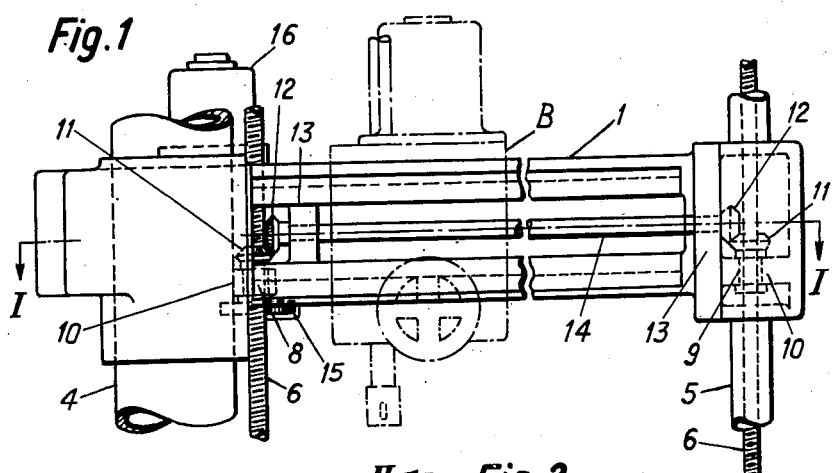
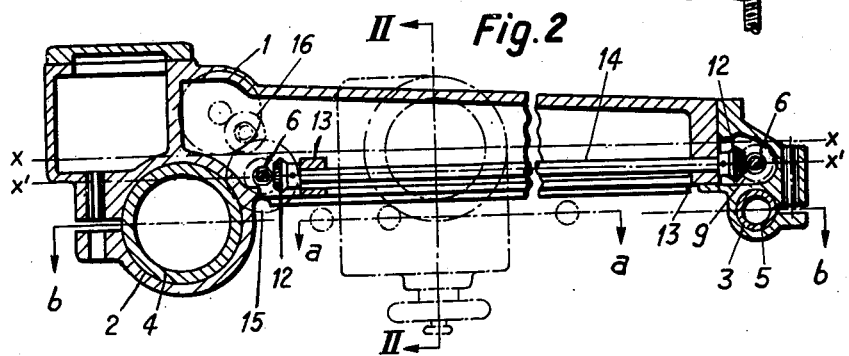
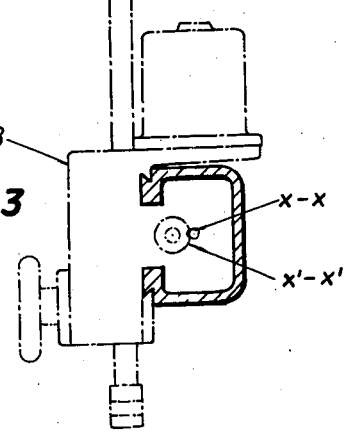
INVENTOR
ALFRED ISELI
BY
Richards & Geier
ATTORNEYS Patented Nov. 29, 1949

2,489,644

UNITED STATES PATENT OFFICE 2,489,644

RADIAL DRILLING MACHINE

Alfred Iseli, Adliswil-Zurich, Switzerland, assignor to Machine Tool Works Oerlikon Administration Company, Zurich-Oerlikon, Switzerland, a company of Switzerland Application April 26, 1947, Serial No. 744,072
In Switzerland March 31, 1944

Section 1, Public Law 690, August 8, 1946
Patent expires March 31, 1964

2 Claims. (Cl. 77—28)

The present invention relates to a radial drilling machine with a swivelling arm that rotates round a main column and carries the drill support and driving motor, the free extremity of said arm being supported by a column which can be fastened to the base plate. In the majority of machines of this type vertical adjustment of the swivelling arm is obtained by means of two vertical threaded shafts commanded by a common drive. so that the motion of the arm is precisely parallel.

This parallel motion excludes all possibility of the arm tilting radially in the guides. On the other hand, when the arm is raised or lowered, it may get stuck in the guides, as the supporting members lie outside the vertical plane of the horizontal axis of the centre of gravity of the system formed by arm, drill support and motor.

It is the purpose of the present invention to prevent this from happening.

The invention consists in applying the effort required to raise and lower the arm to points situated in the vertical plane of the horizontal axis of the centre of gravity, which is determined by the mass of the arm and the weight of the drill support and motor that can be shifted along it. Furthermore the line of action of the drilling pressure and those of the two columns (main and support) are situated in one and the same place.

The result of situating the line of action of the drilling pressure (a—a) in the plane (b—b) of the two columns is that, as the arm is firmly held in place by the latter while the drilling pressure is being exerted, the columns are only subject to traction and no flection couple is formed, such as occurs in other machines.

The accompanying drawing illustrates one specific example of an embodiment of the object of the present invention. In it—

Fig. 1 is a side view of the swivelling arm;

Fig. 2 is a horizontal section through I—I in Fig. 1;

Fig. 3 is a cross-section through II—II in Fig. 2.

Swivelling arm 1 is guided by bores 2 and 3 in its vertical motion along main column 4 and support column 5. Support column 5 can be screwed to the base plate in various positions. In the embodiment illustrated in Figs. 1 and 2 the swivelling arm can be adjusted vertically by means of two threaded shafts 6 that do not rotate and nuts 8 and 9 that can rotate in bearings 10 without altering their axial position. Nuts 8 and 9 are fitted with conical cog-wheels 11 which engage with conical cog-wheels 12 on shafts 14 carried by horizontal bearings 13. Nut 8 has also a toothed wheel 15 from which it receives the movement of electric motor 16. The horizontal axis of the centre of gravity of swivelling arm 1 is indicated by line $x$—$x$ in Fig. 2. When a load is applied to drill support B which together with the motor can be shifted along the swivelling arm, the horizontal axis of the centre of gravity of the whole system is displaced in a direction parallel to line $x$—$x$, providing the guiding surface of the drill support on the swivelling arm is parallel to the horizontal axis of the latter's centre of gravity. In this case $x'$—$x'$ is the horizontal axis of the centre of gravity of the whole system.

If the guiding surface is not parallel to the horizontal axis of the centre of gravity of the swivelling arm, the position of the axis of the centre of gravity of the whole system is so altered that by shifting the drill support balance is destroyed. For this reason it is advantageous to make the guiding surface of the drill support on the swivelling arm parallel to the axis of the centre of gravity of the arm itself. Vertical adjustment of the arm can be obtained by methods different from that above described, for instance with cables or chains. It is essential that they act in the vertical plane of the axis of the centre of gravity of the whole system.

I claim:

1. A radial drilling machine with swivelling arm that can revolve round a main column and carries the drill support and driving motor and whose free extremity is supported by a support column which can be fastened to the base plate said drilling machine being characterised in that the geometrical centers of means for raising and lowering the swivelling arm are located essentially at points situated in the vertical plane of the horizontal axis of the centre of gravity which is determined by the mass of the swivelling arm and the weight of the drill support and motor that move along it and said machine being furthermore characterised in that the geometrical centers of the drill support and of the two columns lie in one and the same place.

2. A radial drilling machine according to claim 1 characterised in that the smooth surface that guides the drill support is made parallel to the horizontal axis of the centre of gravity of the swivelling arm.

ALFRED ISELI.

REFERENCES CITED

The following references are of record in the file of this patent:

FOREIGN PATENTS

| Number | Country | Date |
|---|---|---|
| 346,612 | Great Britain | Apr. 16, 1931 |